Jan. 17, 1928.　　　　　　　　　　　　　　　　　1,656,494
H. G. NUTT ET AL
FRUIT MARKING APPARATUS
Filed Jan. 12, 1927　　　　3 Sheets-Sheet 1
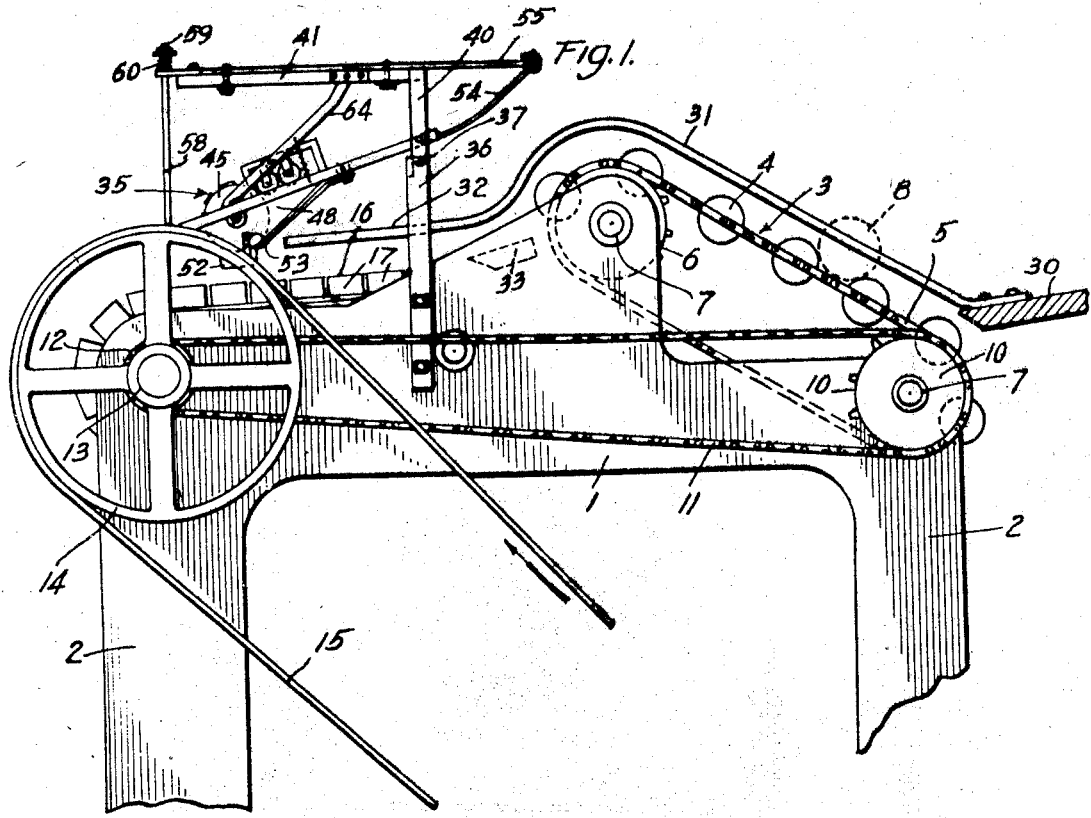
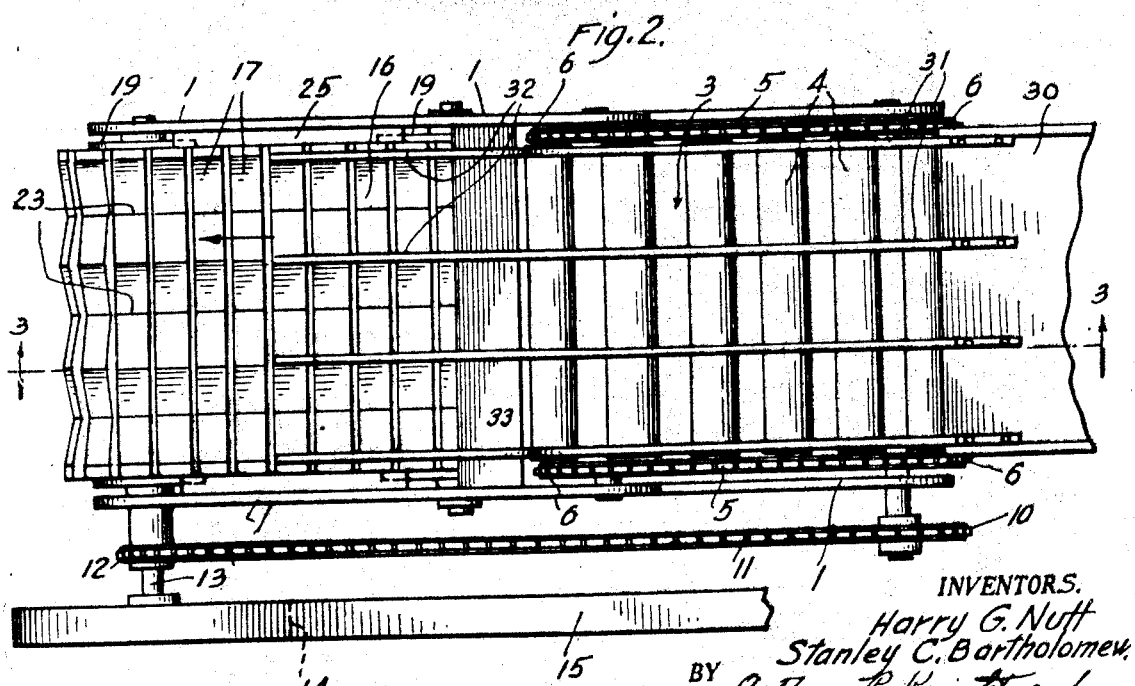
INVENTORS.
Harry G. Nutt
Stanley C. Bartholomew,
BY Arthur P. Knight and
Alfred W. Knight
ATTORNEYS

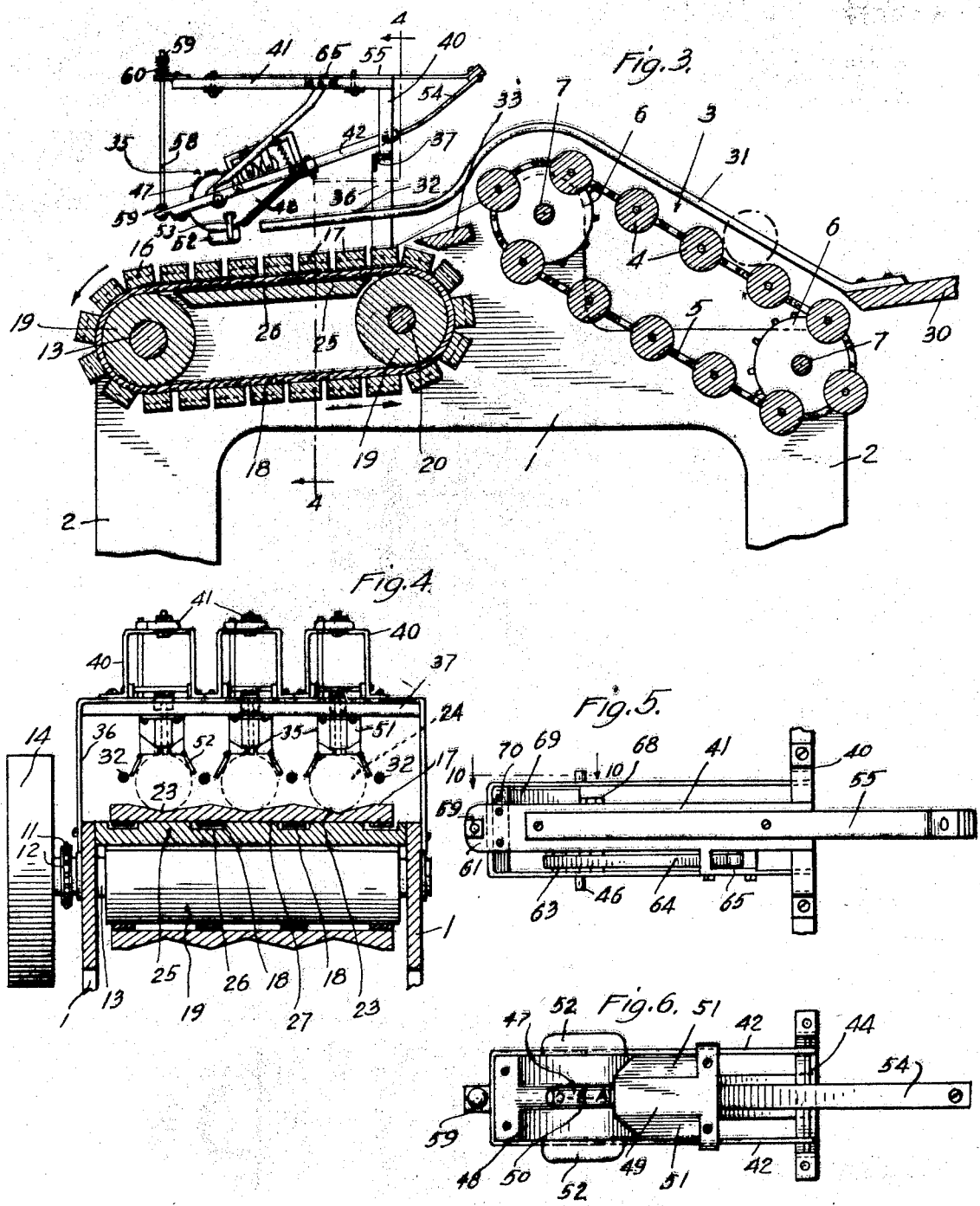

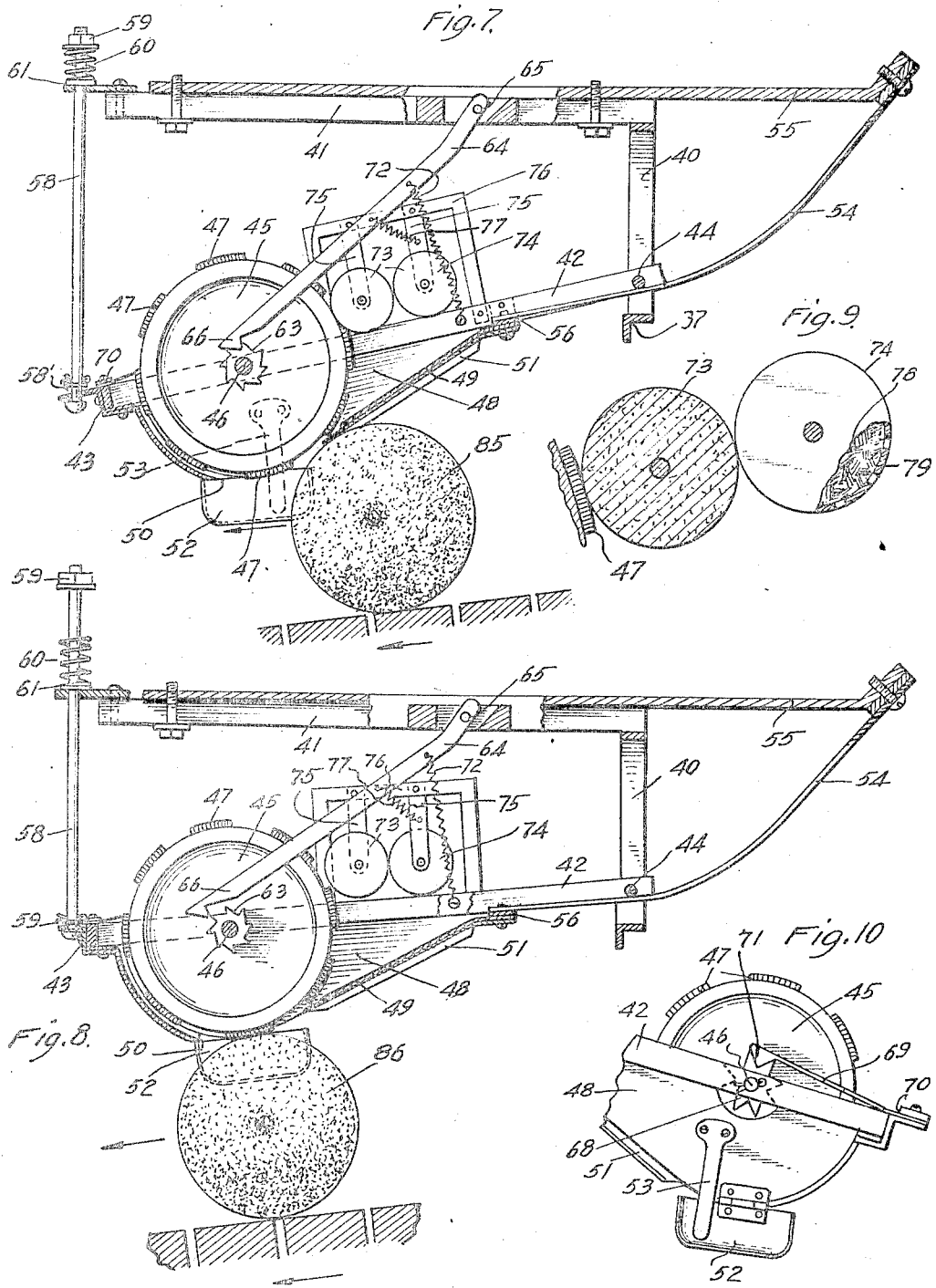

Patented Jan. 17, 1928.

1,656,494

UNITED STATES PATENT OFFICE.

HARRY G. NUTT, OF ALTADENA, AND STANLEY C. BARTHOLOMEW, OF UPLANDS, CALIFORNIA, ASSIGNORS TO SCHEU MANUFACTURING COMPANY, OF UPLANDS, CALIFORNIA, A CORPORATION OF CALIFORNIA.

FRUIT-MARKING APPARATUS.

Application filed January 12, 1927. Serial No. 160,604.

This invention relates to apparatus for marking fruit or other articles, and particularly for marking oranges or other citrus fruit with distinctive names indicating the origin or quality or other characteristics thereof.

The main object of the invention is to provide an apparatus for this purpose which is simple in construction and operation, which will insure impression of the desired name or mark upon the fruit in a clear and legible manner, and which will insure effective marking of all fruit, or of a maximum proportion of all fruit, passed therethrough.

A particular object of the invention is to provide improved means for feeding or delivering the fruit to the marking means, in such manner as to insure the provision of ample space between successive fruits so that each fruit passes independently through the marking means and the marking operation is not interfered with by a preceding or succeeding fruit.

A further object of the invention is to provide marking means which are so operated upon passage of a fruit therethrough as to cause a fresh and newly inked marking element to be brought into position for marking the next fruit.

Further objects of the invention will be apparent from the following specification.

The marking means of our invention comprises essentially a marking roller provided with a plurality of marking or printing elements spaced about the periphery thereof and rotatably mounted upon a supporting arm or rocker arm which is mounted to oscillate in a vertical plane, spring means tending to move or hold said supporting arm downwardly against suitable stop means, but permitting the same to be moved upwardly upon passage of a fruit beneath the marking roller and in contact with one of the marking elements thereon, suitable pawl and ratchet means whereby the downward movement of said supporting arm under the action of said spring means following passage of a fruit therethrough operates to rotate said marking roller so as to bring a fresh marking element into marking position, and means for inking the marking elements upon such rotation of said marking roller and at a point other than said marking position. The marking means further preferably comprise suitable fruit-engaging means rigidly mounted on said supporting arm and projecting in such position as to be engaged by a fruit before such fruit comes into engagement with the marking roller and also during the time of such engagement with the marking roller, in such manner as to cause the fruit to lift the roller and supporting arm by means of upward force exerted principally upon said abutment means rather than directly upon the roller itself. Said abutment means are preferably so formed as to constitute housing means for the marking roller.

The apparatus further comprises means for feeding the fruit in properly spaced manner into position to engage said fruit-engaging means and said roller and for carrying the fruit beneath the same, said fruit-engaging means and marking roller being normally spaced above said feeding means by a distance less than the diameter of the fruit to be marked, and said feeding means being so constructed and arranged as to cause the fruit carried thereby beneath the fruit-engaging means to exert sufficient upward pressure thereon to lift the supporting arm and marking roller as above described. In order to provide the desired marking capacity, any desired number of the above described marking means may be mounted side by side or in parallel arrangement and in such cases a single feeding means may be employed for passing the fruit through all of such marking means, and we have shown such a construction in the drawings.

The accompanying drawings illustrate embodiments of our invention and referring thereto:

Fig. 1 is a side elevation of the marking apparatus including the feeding means.

Fig. 2 is a plan view thereof with the marking means removed.

Fig. 3 is a longitudinal section of the complete apparatus on line 3—3 in Fig. 2.

Fig. 4 is a transverse section on line 4—4 in Fig. 3.

Fig. 5 is a plan view of one of the marking means.

Fig. 6 is an inverted plan view thereof.

Fig. 7 is a longitudinal vertical section of one of the marking means with the parts in the position which they occupy when a fruit first comes into engagement therewith.

Fig. 8 is a similar view but with the parts in raised position during passage of the fruit beneath the marking roller.

Fig. 9 is an enlarged vertical section of the inking means.

Fig. 10 is a partial view on line 10—10 in Fig. 5 showing the means for accurately positioning the marking elements upon rotation of the roller.

The apparatus shown in the drawings is mounted on a supporting frame having two side members 1 mounted on legs 2. An elevator or conveyor 3 is mounted on said frame, said elevator comprising, for example, a plurality of round bars or rolls 4 mounted at their ends on chains 5 running over sprockets 6. Said sprockets may be mounted on shafts 7 which in turn are rotatably mounted in the side frame members 1. The bars 4 are spaced apart sufficiently to permit a fruit to rest between adjacent bars as indicated in dotted lines at 8 in Fig. 1. For the purpose of driving said elevator a sprocket 10 on one of the shafts 7 may be connected by driving chain 11 to a sprocket 12 on shaft 13, upon which latter shaft may also be mounted drive pulley 14 driven by belt 15 which may be operated in any suitable manner.

Beyond the end of elevator 3 is mounted a conveyor 16 whose upper run is preferably inclined somewhat downwardly in the direction of travel of the fruit thereon, that is, from right to left in Figs. 1 to 3. Said conveyor may comprise a plurality of slats or bars 17 mounted upon a number of parallel belts 18 so as to extend transversely of said belts. Said belts are mounted on rollers or pulleys 19, one of said pulleys being, for example, mounted on shaft 13 aforesaid and the other being mounted on an idler shaft 20, both of which shafts are rotatably mounted in side frame members 1. Each of the slats or bars 17 may be provided with a plurality of depressions 23 spaced apart transversely of the belt a sufficient distance to permit a fruit to rest or travel in each of said depressions as indicated in dotted lines at 24 in Fig. 4, it being understood that the depressions in successive slats or bars are all in alignment with one another so as to provide in effect a number of guiding troughs or grooves extending longitudinally of the conveyor. A rigid supporting means, such as a flat supporting plate 25 may advantageously be mounted between side frame members 1 so as to extend beneath the upper runs of belts 18 and the slats 17 mounted thereon, said supporting plate being provided with longitudinal grooves or recesses 26 within which the belts 18 may run freely and with flat bearing faces 27 upon which the slats 17 rest so as to slide thereon upon movement of the belt. By means of such a supporting arrangement the rigid supporting means 25 engages the conveyor slats directly beneath the several marking elements and the downward pressure of the fruit upon passing beneath the marking means as hereinafter described is supported upon the supporting plate 25 and not upon the belts 18.

In order to provide for proper spacing of the fruit upon the conveyor belt before reaching the marking means we prefer to operate said conveyor at a somewhat faster speed than the elevator or conveyor 3 is operated, and for this purpose the sprocket 12 may be made somewhat smaller than sprocket 10, for example, about half the size thereof, while pulleys 19 are approximately equal in diameter to sprockets 6. The rotative speeds of pulleys 19 and sprockets 6 will therefore be inversely proportional to the diameters of sprockets 12 and 10 and the same relation will hold between the lineal speeds of conveyor 16 and elevator 3.

Any suitable means such as inclined delivery chute 30 may be provided for supplying the fruit to the lower end of elevator 3 and a plurality of properly spaced guide bars 31 may be mounted on the lower end of such supply means and may extend upwardly over the elevator and be curved downwardly into position above the conveyor 16 as indicated at 32, so as to properly guide or space the fruit transversely of the elevating and conveying means. A slat 33 may be mounted as shown, in position to cause the fruit discharged from the upper end of the elevator 3 to pass on to the conveyor 16, thus providing for unobstructed passage of fruit from the upper end of said elevator on to said conveyor, the elimation of checking means at this point being made possible by the greater relative speed of the conveyor, which prevents over-crowding of the fruit thereon, as hereinafter explained.

The marking means may be mounted above the conveyor 16, there being one of said marking means above each of the longitudinal grooves or troughs provided by the depressions 23 in slats 17. For example, in the case illustrated, the apparatus is adapted for marking three series of fruit in parallel, and we have therefore provided three marking means 35 which are identical in construction and operation, and three guiding grooves on the conveyor 16 which are in alignment directly beneath the marking rollers of the respective marking means. Said marking means may be mounted upon a suitable supporting frame comprising, for example, vertical members 36 extending upwardly from side frame members 1 and cross members 37 mounted on said vertical members.

Each of the aforesaid marking means, as shown particularly in Figs. 7 to 10, comprises a supporting frame including a yoke 40 mounted upon the cross member 37 and a longitudinal bar 41 mounted upon said yoke. A movable supporting arm or rocker arm comprising longitudinal members 42 and an end member 43 is pivotally mounted upon said frame, for example, by pivotally mounting the upper end of each side member 42 on a pivot member 44 extending between the legs of yoke 40. A marking roller 45 is rotatably mounted on shaft 46 extending between the side members 42 of said rocker arm near the lower ends thereof. Said marking roller is provided with a plurality of marking or printing elements 47 spaced at equal intervals about the periphery thereof, and secured thereto in any suitable manner. Each of said marking elements may comprise a plate of metal or other material provided with upraised type representing the name or mark to be printed upon the fruit.

A housing 48 is mounted upon side members 42 and end member 43 of the rocker arm, and extends downwardly therefrom so as to entirely enclose the lower portion of the marking roller 45, but is provided with an opening 50 in the bottom portion thereof so as to permit access of a fruit to a marking element which is in position at the bottom of roller 45. The bottom wall 49 of housing means 48 is preferably inclined upwardly away from said opening in the direction from which the fruit approaches the marking means, so as to be engaged by the fruit and enable such fruit to exert a lifting action thereon in its passage beneath the marking means. Said bottom wall therefore constitutes a fruit-engaging means. Such inclined portion of said housing means is also preferably provided with guide plates 51 extending downwardly and outwardly at either side thereof so as to accurately center the fruit beneath the marking roller, and centering plates 52 pivotally mounted at each side of the lower portion of housing means 48 and pressed inwardly by springs 53 may also be provided for maintaining a fruit in centered position during the marking operation. The grooves in conveyor 16, guide rods 31 and 32, and guide plates 51 and 52 therefore cooperate to cause the fruit to travel in a definite path.

A leaf spring 54 may be secured at its upper end to an extension bar 55 mounted on bar 41 and may extend beneath the pivot member 44 and be secured at its lower end to cross bar 56 which is secured to side members 42, in such manner that said leaf spring exerts a downward force upon said cross bar and hence tends to hold the supporting arm and the marking roller carried thereby in a lowered position. Any other spring means may, however, be substituted, for this purpose. Suitable stop means are provided for limiting the downward movement of the marking roller, said stop means comprising, for example, a vertical rod 58 loosely connected as at 58' to the outer end of the supporting arm and provided at its upper end with a nut 59 engaging a cushioning spring, rubber, or other resilient member 60 which in turn bears against suitable fixed means 61 on the supporting frame. Said stop means are so positioned that when the rocker arm and marking roller are in position against the same the distance between the marking roller and conveyor 16 is less than the diameter of the smallest fruit to be marked.

A ratchet wheel 63 is secured to roller 45 at one side thereof and an arm 64 is pivotally mounted as at 65 on the longitudinal frame member 41 and provided at its lower end with a pawl member 66 engaging said ratchet wheel. Said marking roller is provided at its other side with a toothed wheel 68 and a spring member 69 is mounted at 70 on the supporting arm and provided at its end with a pointed or other suitably-shaped lug or dog 71 adapted to engage between adjacent teeth of wheel 68 so as to tend to stop and hold the marking roller in certain definite positions, such that one of the marking elements 47 will always be presented in position in the center of opening 50 when the marking roller is stopped. Spring 72 may be provided for holding the pawl arm 64 down against ratchet wheel 63.

Suitable inking rollers 73 and 74 may be suspended by hangers 75 from suitable frame means 76 mounted on the movable supporting arm aforesaid and a tension spring 77 may be provided for holding said inking rollers in position to engage the marking elements 47 upon rotation of roller 45. The inking roller 74 may constitute a supply roller and may comprise cotton wicking, felt, sponge rubber, or other absorbent material 78 enclosed in a perforated metal casing 79, while roller 73, which is positioned to contact with the printing elements 47, may also consist of absorbent or porous material, such as sponge rubber.

The operation of the above described apparatus is as follows:

The fruits to be marked are fed on to the supply or delivery chute 30 in any suitable manner, and roll down to the bottom of said chute and on to the lower end of elevator 3. The rate of feeding is preferably such as to cause the fruits to collect in the lower end of chute 30 and distribute themselves between bars 31 so as to cause a substantially equal number of fruits to pass between each pair of adjacent bars. Each fruit is picked up between bars 4 and carried to the top of the elevator, whence it falls or rolls over the inclined slat 33 and on to the conveyor 16. It will be seen that each fruit is thus delivered to one of the guiding grooves or troughs formed by the depressions 23 and is therefore caused to pass beneath the center of the corresponding marking means. Since, as above stated, the velocity of conveyor 16 is greater than that of elevator 4, the velocity of each fruit is increased when it reaches the conveyor so that it is caused to move ahead more rapidly than the next succeeding fruit which has not yet reached the conveyor, thus providing an appreciable space between successive fruits on the conveyor. This feature of the invention is of material advantage as it permits the raising and lowering of the marking means by passage of one fruit beneath the same to be completed before engagement of the next fruit therewith. If the fruits were to follow one another too closely in their passage beneath the marking means, one fruit would be apt to come into engagement with the inclined portion of housing means 48 before the lowering of the marking roller was completed, which would prevent the marking roller from being fully rotated so as to bring a new printing element into marking position.

When a fruit reaches the position indicated at 85 in Fig. 7 it comes into engagement with the inclined portion of the lower fruit engaging wall 49 of housing means 48 and exerts a lifting or cam action thereon. The downward force exerted on the fruit due to this lifting action is entirely supported upon the flat bearing faces 27 of the supporting plate 25 and not upon the conveyor belts 18. It will be noted that for this purpose each of the bearing faces 27 is disposed directly beneath one of the guiding grooves or troughs formed by depressions 23. As the fruit comes into such engagement with the marking means it is accurately centered or prevented from being displaced laterally by means of guide plates 51 and by the grooves formed by depressions 23 in the conveyor.

As the fruit continues its passage beneath the marking means it finally reaches the position indicated at 86 in Fig. 8, at which time it rolls beneath and in contact with the marking or printing element 47 which is at that time in marking position within the opening 50, and receives a printed impression therefrom. It will be noted that as the marking roller is lifted it is displaced relative to the arm 64 in such manner as to cause the pawl member 66 to slide over one of the teeth on ratchet wheel 63. The arrangement is such that the smallest sized fruit to be marked will effect sufficient displacement of the marking roller to bring about this movement of the pawl member. A larger fruit simply causes the pawl member to be moved further in the same direction, but does not alter the effect thereof. During the lifting operation and the passage of the fruit beneath the marking roller, such roller is prevented from being rotated by engagement of dog 71 with toothed wheel 68, such dog being pressed into position between adjacent teeth by means of spring 69 with sufficient force to prevent the roller from being rotated by frictional engagement of the fruit therewith. The guide plates or centering plates 52 serve to hold the fruit accurately in centered position during the passage thereof beneath and in contact with the marking element 47.

As soon as the fruit passes beyond the position shown in Fig. 8, spring 54 operates to return the rocker arm and marking roller to lowered position. In this return movement the pawl member 66 on arm 64 engages the tooth over which it has passed and causes ratchet wheel together with marking roller 45 to be rotated in a clockwise direction (in Figs. 7 and 8) sufficiently to bring the next succeeding marking element into marking position within the opening 50. At the same time another of the marking elements is caused to pass in contact with inking roller 73 and receive a fresh application of ink therefrom. The raising and lowering of the rocker arm which is effected by the fruit in its passage beneath the marking means, therefore operates automatically through the pawl and ratchet means above described, not only to cause one of the marking elements on said roller to pass in contact with inking means, but also to move another marking element, which has previously received an application of ink, into marking position. The cushioning spring 60 serves as a stop to limit the downward movement of the rocker arm and marking roller, while at the same time preventing undue jar or shock on the operating parts as would be the case if rigid stop means were provided.

The above described fruit marking apparatus may be used in the marking of any fruit or other article which is adaptable in the above operation. It is intended, however, principally for the use in the marking of citrus fruit and particularly oranges or other substantially spherical fruit. Such apparatus may be placed at any convenient location with respect, in the preparation of oranges for packing, it may be placed between the grader and the sizer or directly following the sizer or at any other convenient point.

We claim:

1. A fruit marking apparatus comprising means for causing a fruit to travel in a definite path, a marking roller provided with a plurality of marking elements spaced about its periphery, means rotatably supporting said marking roller in position to cause one of said marking elements to engage a fruit travelling in said path, fruit-engaging means, means tending to hold said fruit-engaging means in position in said definite path so as to be engaged by a fruit travelling in said path, but permitting the same to be displaced from such position by such engagement of a fruit therewith, and means operable upon movement of said fruit-engaging means out of and into such position to rotate said marking roller sufficiently to bring another of said marking elements into fruit-engaging position.

2. An apparatus as set forth in claim 1 and comprising in addition, inking means disposed adjacent the periphery of said marking roller at a position other than said fruit-engaging position and such that said rotation of said marking roller causes one of said marking elements to pass in inking relation to said inking means.

3. A fruit marking apparatus comprising a conveyor, a rocker arm mounted above said conveyor to oscillate in a vertical plane, a marking roller rotatably mounted on said rocker arm and provided with a plurality of marking elements spaced about its periphery, means tending to hold said rocker arm downwardly, resilient stop means limiting the downward movement of said rocker arm, said conveyor being adapted to convey fruit deposited thereon beneath said marking roller and in contact with one of said marking elements and said conveyor being spaced from said marking roller by a distance less than the diameter of the fruit to be marked so as to cause the fruit so conveyed beneath the marking roller to raise the same and to thereafter permit it to be lowered to position against said stop means, and pawl and ratchet means operable upon such raising and lowering of said marking roller to rotate said marking roller so as to move a new marking element into position to be engaged by the fruit.

4. An apparatus as set forth in claim 3 and comprising in addition inking means disposed adjacent the periphery of said marking roller at a position other than the position of engagement of the fruit therewith, in such manner that rotation of said marking roller causes another of the marking elements thereon to pass in contact with said inking means.

5. An apparatus as set forth in claim 3 and comprising in addition fruit engaging means rigidly mounted on said rocker arm in position to be engaged by fruit prior to engagement thereof with said marking roller.

6. An apparatus as set forth in claim 3, and comprising in addition housing means rigidly mounted on said rocker arm and enclosing the lower portion of said marking roller, a portion of the bottom of said housing means being inclined downwardly in the direction of travel of said conveyor and being disposed in position to engage a fruit on said conveyor before engagement thereof with said marking roller.

7. A fruit marking apparatus comprising a marking roller provided with a plurality of marking elements spaced about the periphery thereof, a conveyor extending beneath said marking roller and spaced therefrom, means rotatably supporting said marking roller and tending to hold the same in normal position spaced from said conveyor by a distance less than the diameter of the fruit to be marked, but permitting said marking roller to be moved upwardly from said position, means tending to restore said marking roller to its normal position when so raised, means normally holding said marking roller in such rotative position as to place one of said marking elements in marking position above said conveyor, and means operable upon the raising and lowering of said marking roller to rotate the same so as to bring another of said marking elements into marking position.

8. In a fruit marking apparatus, a conveying means comprising pulley means, a plurality of endless belts running over said pulley means and spaced from one another, a plurality of transverse members mounted upon said belts and provided with aligned fruit guiding means at the portions between the belts, and fixed supporting means extending beneath said belts and said transverse members, and being provided with longitudinal slots of greater depth than said belts and with a flat bearing surface in contact with the portions of said transverse member between said belts.

9. A fruit marking apparatus comprising a conveyor, marking means spaced from said conveyor, said conveyor being so positioned as to cause fruit deposited thereon to pass in operative engagement with said marking means and said marking means being operable to mark fruit so passed in engagement therewith, elevator means mounted to deliver fruit in a definite spaced relation to a position above the feed end of said conveyor, means permitting unobstructed passage of fruit from the upper end of said elevator on to said conveyor, and means for driving said conveyor and said elevator means as to cause said conveyor to have a greater linear velocity than said elevator means.

In testimony whereof we have hereunto subscribed our names this 7th day of January, 1927.

HARRY G. NUTT.
STANLEY C. BARTHOLOMEW.